United States Patent [19]

Wise et al.

[11] Patent Number: 4,538,024
[45] Date of Patent: Aug. 27, 1985

[54] FLAT MULTICONDUCTOR CABLE EXTRUDED ON A WHEEL

[75] Inventors: Joseph A. Wise, Hershey; Michael P. Green, Mechanicsburg, both of Pa.

[73] Assignee: AMP Incorporated, Harrisburg, Pa.

[21] Appl. No.: 598,142

[22] Filed: Apr. 9, 1984

Related U.S. Application Data

[60] Division of Ser. No. 510,475, Jul. 1, 1983, , which is a continuation-in-part of Ser. No. 437,999, Nov. 1, 1982, abandoned.

[51] Int. Cl.³ .............................................. H01B 7/08
[52] U.S. Cl. .............................. 174/117 F; 174/121 R
[58] Field of Search ............... 174/117 F, 117 FF, 34, 174/121 R; 156/179, 436

[56] References Cited

U.S. PATENT DOCUMENTS

| | | | |
|---|---|---|---|
| 2,944,285 | 7/1960 | Rhodes | 18/12 |
| 3,082,292 | 3/1963 | Gore | 174/117 F |
| 3,239,396 | 3/1966 | Bohannon | 156/52 |
| 3,445,915 | 10/1966 | Cuckson et al. | 29/408 |
| 3,540,956 | 11/1970 | Arnold et al. | 174/117 F X |
| 3,622,687 | 10/1970 | Doughty | 174/117 F |
| 3,656,360 | 4/1972 | Fix | 156/179 X |
| 3,775,552 | 11/1973 | Schumacher | 174/117 F X |
| 3,778,879 | 12/1973 | Ottolander | 174/117 F X |
| 3,833,755 | 9/1974 | Soelberg | 174/117 F |
| 3,999,914 | 12/1976 | Breher et al. | 425/114 |
| 4,080,148 | 3/1978 | Wise | 425/576 |
| 4,096,010 | 6/1978 | Parham et al. | 156/179 |
| 4,110,505 | 8/1978 | Prewo | 156/179 X |
| 4,171,860 | 10/1979 | Katz | 174/117 F X |
| 4,230,898 | 10/1980 | Emmel | 174/117 F X |
| 4,321,425 | 3/1982 | Emmel | 174/117 X |
| 4,444,709 | 4/1984 | Hayashi et al. | 156/436 X |

FOREIGN PATENT DOCUMENTS

| | | |
|---|---|---|
| 513634 | 12/1980 | Australia . |
| 882494 | 7/1953 | Fed. Rep. of Germany . |
| 2149365 | 3/1973 | France . |

Primary Examiner—A. T. Grimley
Assistant Examiner—Morris H. Nimmo
Attorney, Agent, or Firm—Russell J. Egan; F. W. Raring

[57] ABSTRACT

Apparatus for manufacturing ribbon cable having a plurality of filamentous elements comprises a wheel having a circumferential surface interrupted by a plurality of parallel grooves in which the elements are seated over a common arc. Elements are supplied tangentially toward the wheel as the wheel is rotated and plastic is extruded at a point on the common arc to form a ribbon cable with elements exposed where they lay in the grooves. Elements are entrapped in cable by plastic bridges formed in lateral channels or recesses which interrupt the grooves and permit plastic to flow around elements, by fiber mat which the plastic impregnates, by melt-bonding to plastic insulated wire, by adhesive, or by nearly complete entrapment of elements resulting from a shallow groove profile. An additional layer of plastic may be extruded onto the cable so produced to yield a conventional fully insulated ribbon cable, or for some cable profiles the cable may be mated to like cable for a close centerline spacing of elements.

1 Claim, 21 Drawing Figures

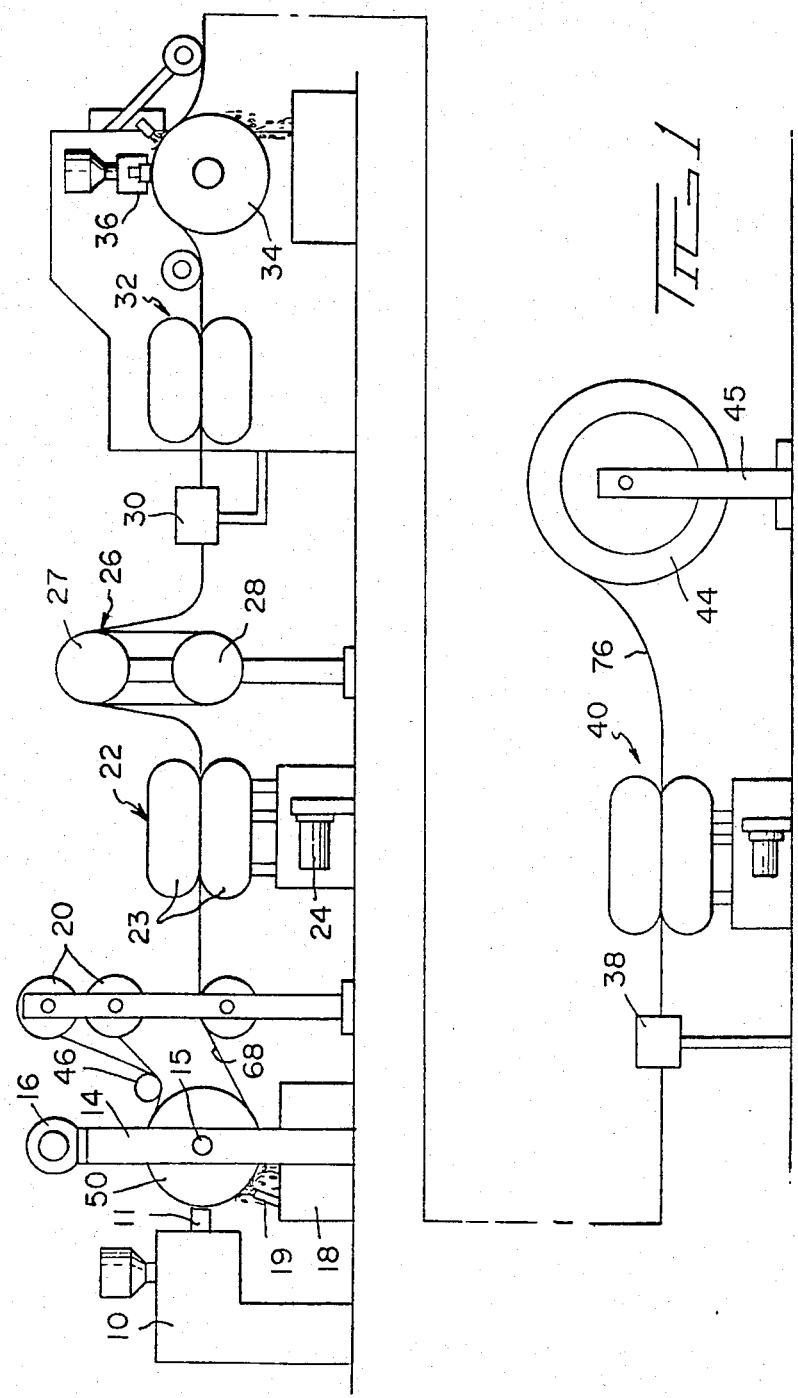

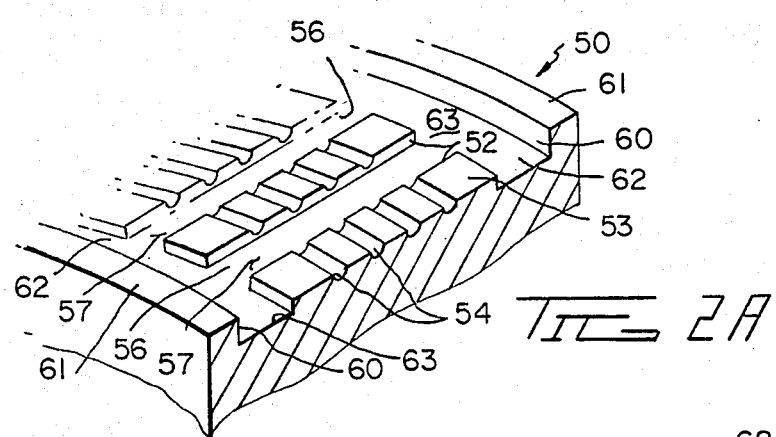
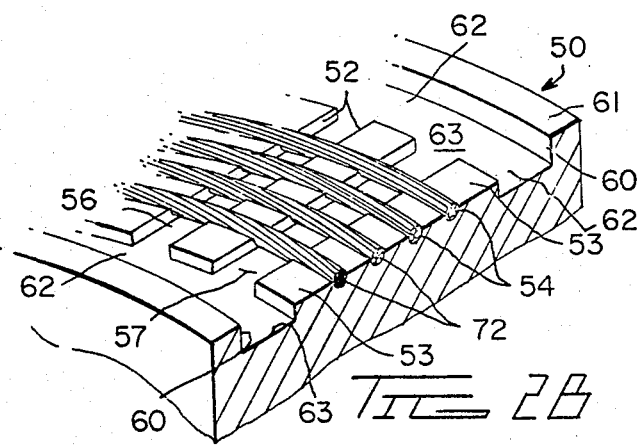
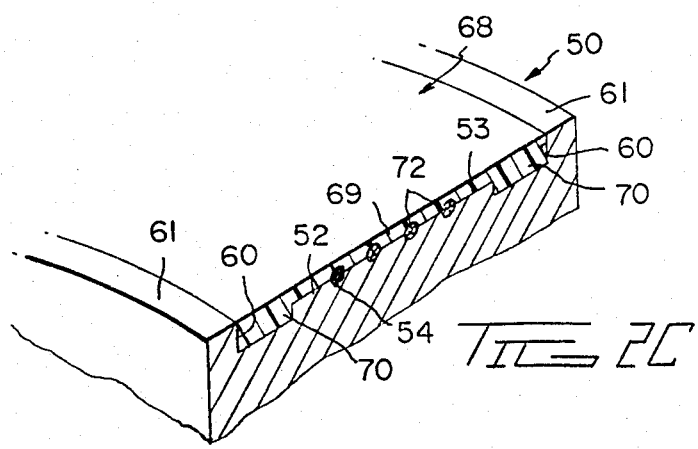

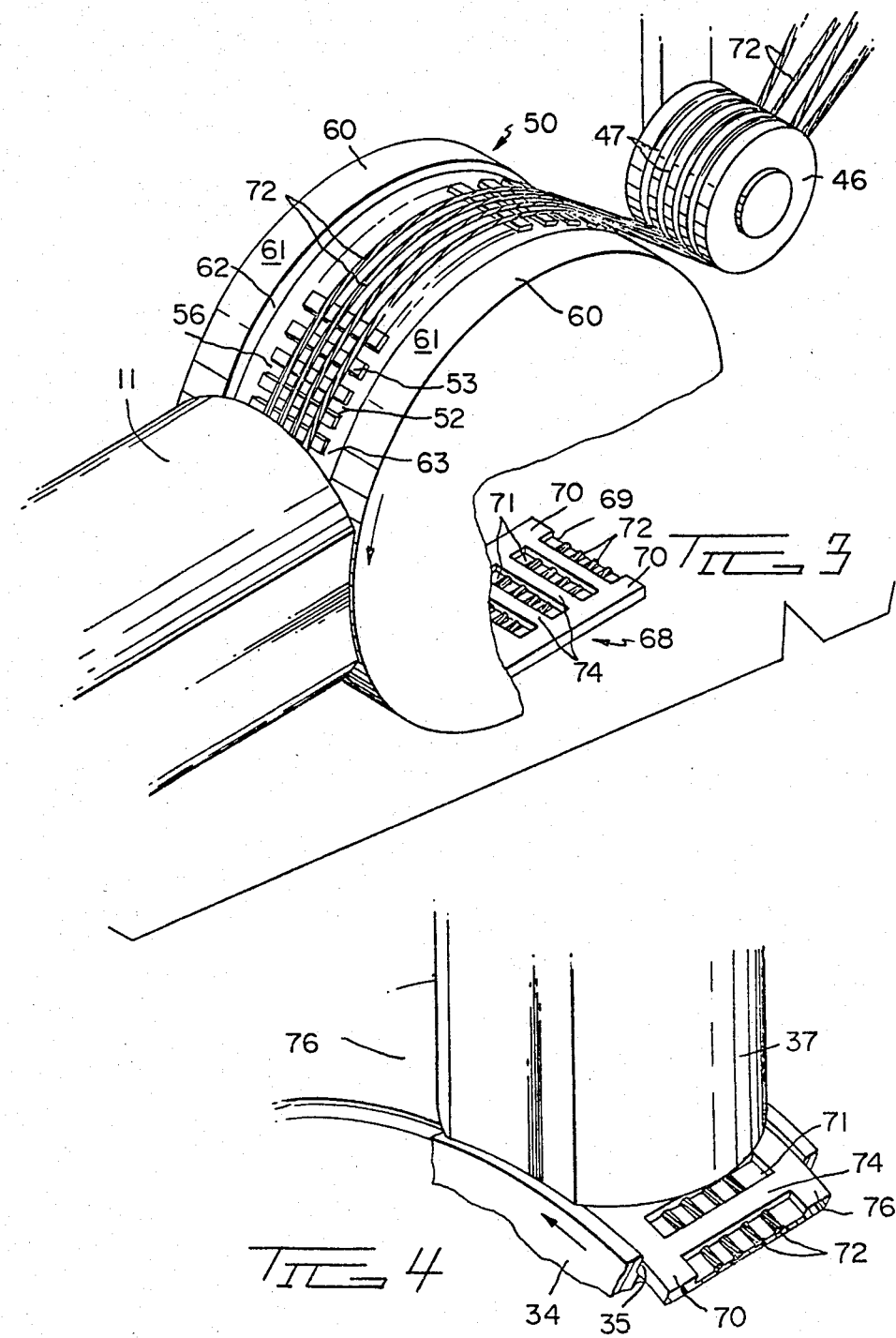

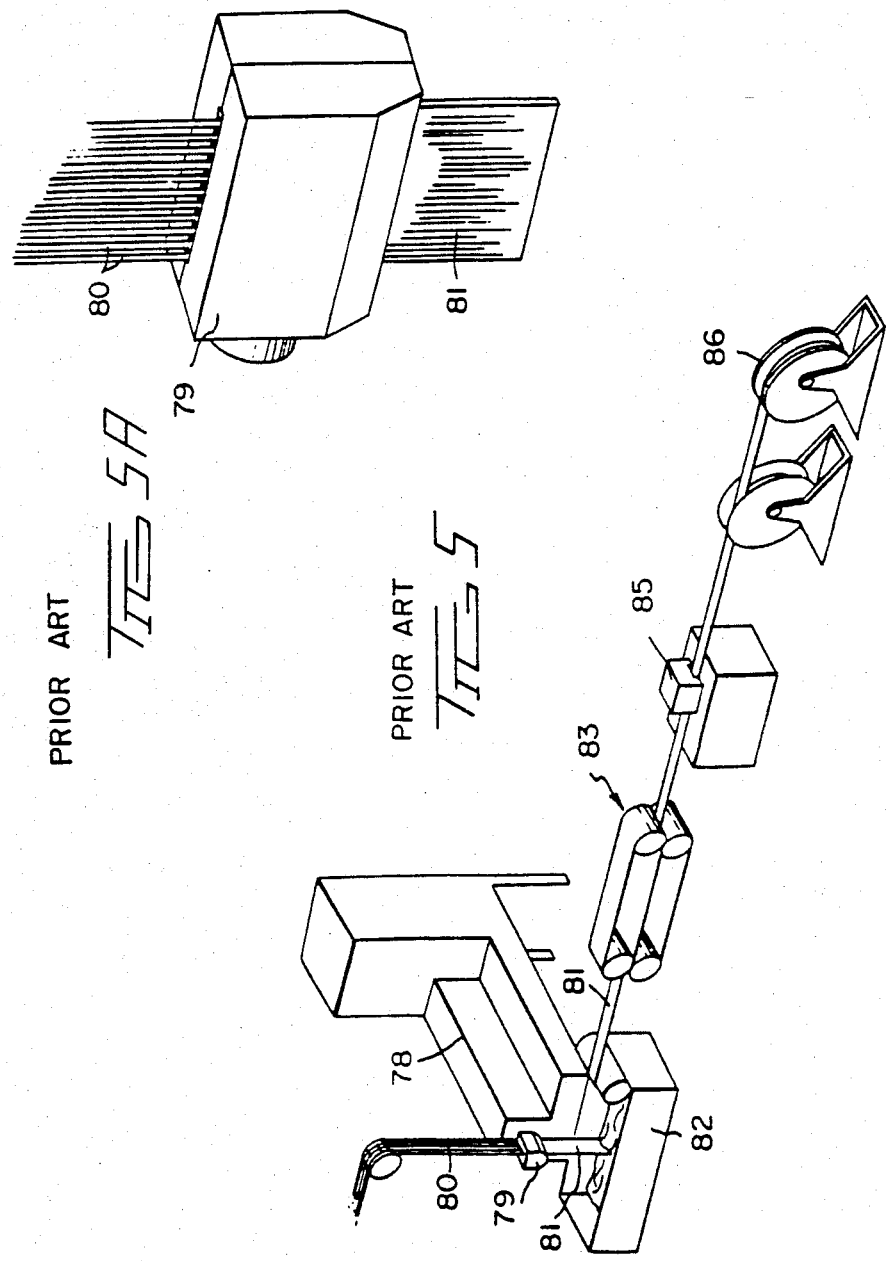

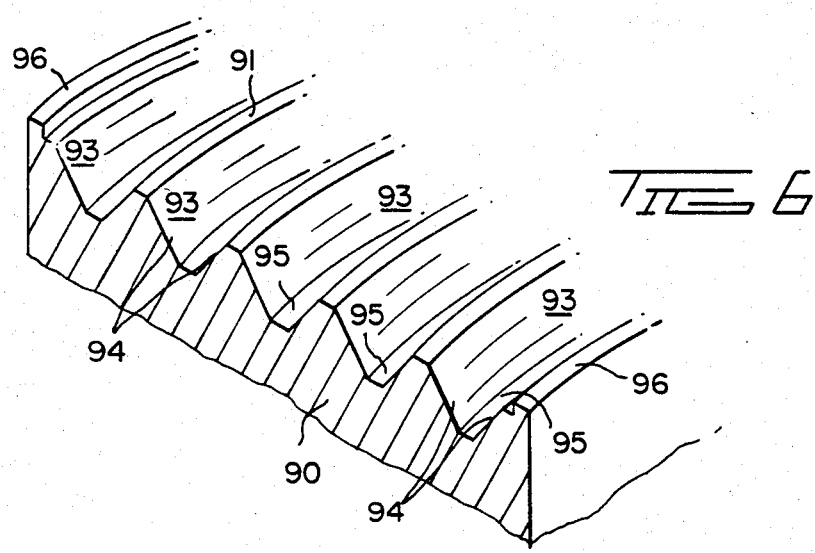
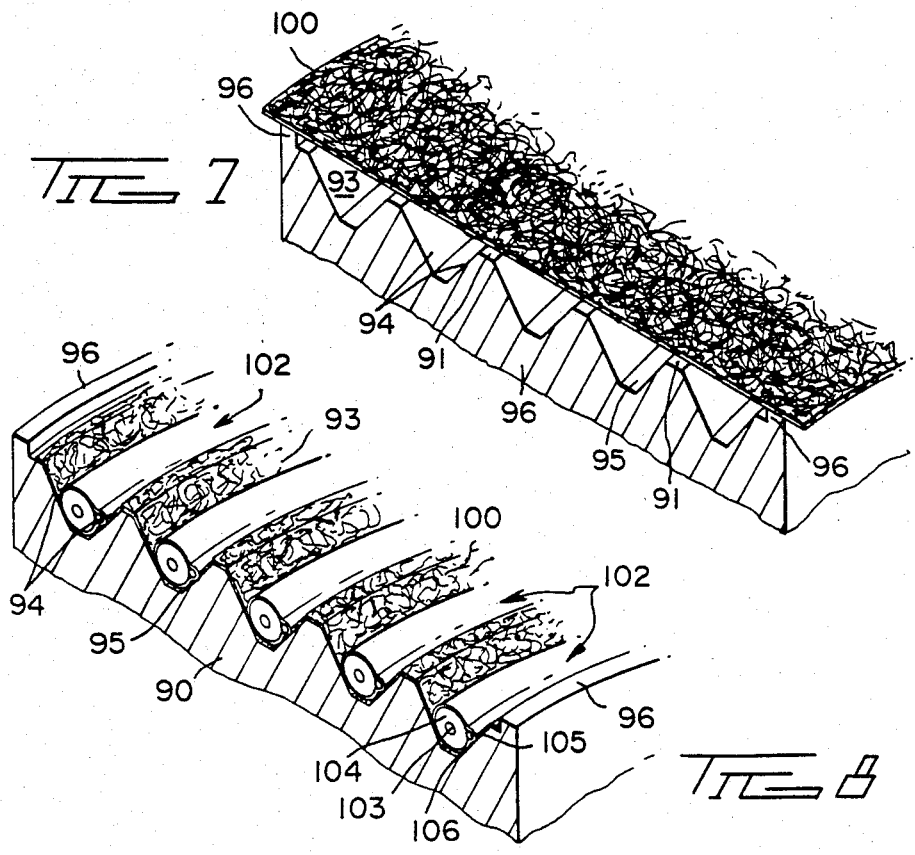

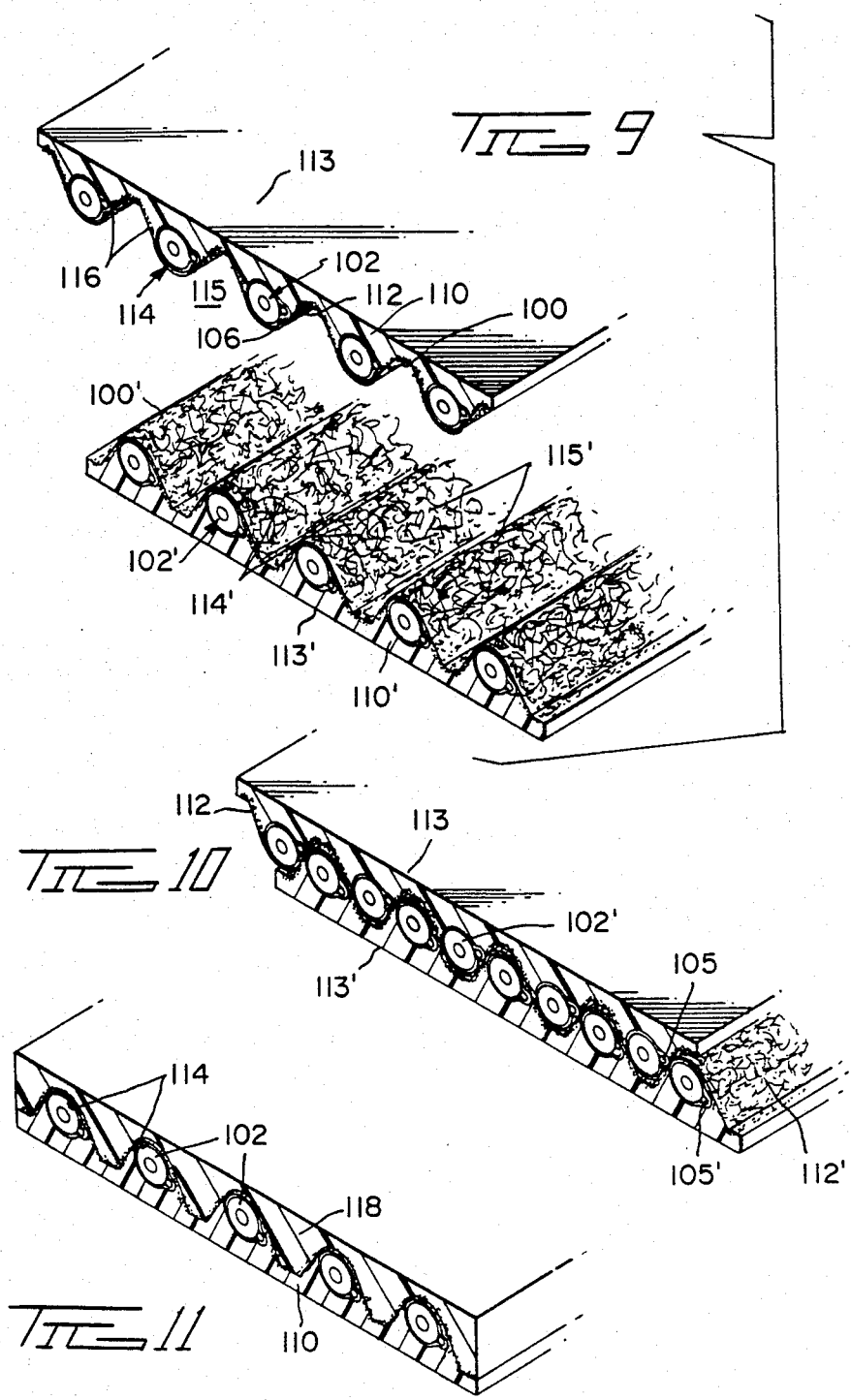

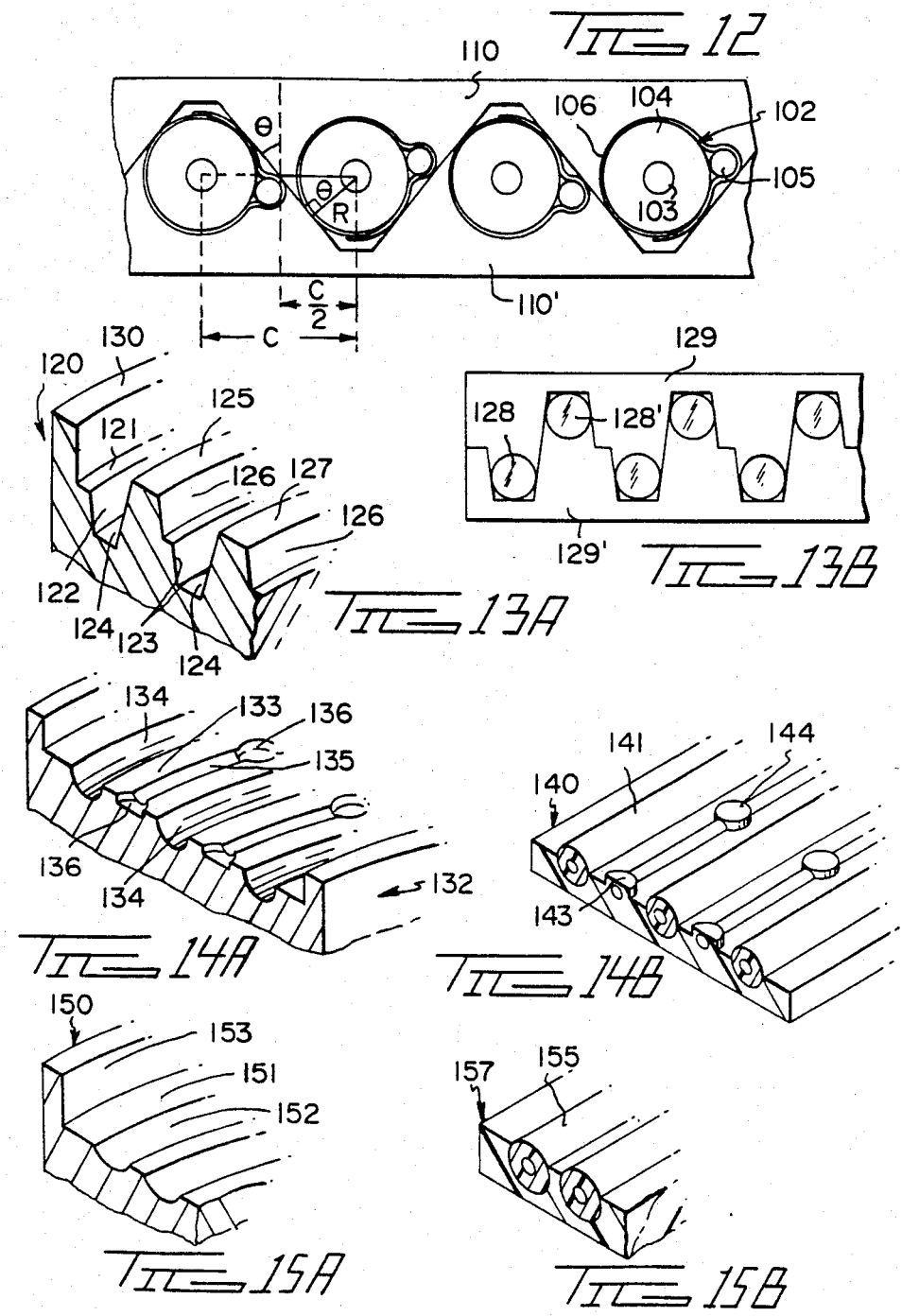

FLAT MULTICONDUCTOR CABLE EXTRUDED ON A WHEEL

This application is a Divisional of U.S. application Ser. No. 510,475, filed July 1, 1983, which is a Continuation-in-part of U.S. Application Ser. No. 437,999 filed Nov. 1, 1982, now abandoned.

BACKGROUND OF THE INVENTION

The present invention relates to flat multiconductor cable, and particularly to an apparatus for extruding such cable.

Filamentous elements such as electrical conductors are commonly enclosed in plastic material such as PVC, which provides electrical insulation and serves to maintain the spacing of the elements. Such ribbon cable, as it is known, is usually manufactured by drawing the elements through a die where an uncured polymeric composition is forced around the elements in a closed cavity in the die. Curing is subsequently accomplished by cooling, preferably hastened by passing through a water bath. One of the problems in the prior art method is the inherent difficulty in maintaining the spacing of the elements during the extrusion and cooling stages, where movement of the plastic and shrinkages can cause the elements to wander toward each other, which can lead to undesirable noise or short circuiting. Another difficulty with the prior art lies in aligning the elements in the die both initially and in the event of breakage.

SUMMARY OF THE PRESENT INVENTION

The present invention utilizes an extrusion wheel which moves past an extrusion head where plastic insulation is extruded against the circumference of the wheel to form a ribbon cable. The circumference is profiled with a series of parallel grooves which serve to align the elements or wires circumferentially about the wheel as it passes the extrusion head where plastic is extruded against the wires except where they are seated in the grooves. The semifinished cable is cooled before it leaves the wheel so that spacing of the wires is maintained during extrusion and cooling. Replacement of a broken strand is readily accomplished by taping a wire in one of the parallel grooves on the wheel.

In one embodiment, each groove as heretofore described is actually a series of axially aligned grooves in respective lateral ribs on the circumference of the wheel; the ribs are separated by channels where plastic is extruded around the elements to entrap them in bridges of plastic in the cable. Where periodic total encapsulation of elements is desired but the elements cannot tolerate the pressure generated in the channels, periodic recesses can be cut into the wheel along the grooves to allow plastic to flow under the circuit at those spots. The amount of entrapment and pressure are controlled by the size of the recess.

For elements that are fully insulated with a material that is compatible with the plastic cable, a bond can be produced by extruding the cable slightly hotter than normal. The plastic will partially melt the insulation without damaging the elements; when the cable cools, the cable insulation will be melt-bonded to the circuit insulation. For elements that are not insulated or insulated with materials that are not compatible with the cable insulation, an adhesive can be applied to the elements to bond them to the cable insulation. Entrapment of wires may also be achieved by partial encapsulation along their entire length. This is accomplished with groove profiles having cross sections of less than 180 degrees of arc. For example, a continuous shallow groove having a 120 degree arc profile results in 240 degrees of cable encapsulation.

A thin, low-pressure, complete entrapment is achieved by placing a thin fiber mat against the wheel before the elements are laid in the grooves. During extrusion, the cable insulation penetrates the mat and bonds to it, entrapping the circuits between the mat and cable insulation. This method, like adhesive bonding, is useful where melt-bonding is not possible, as where the filamentous elements are foil shielded coaxial conductors. The embodiments which do not have bridges in the cable offer the possibility of laminating to a second semifinished cable of like profile formed on a specially profiled wheel.

Advantages of the apparatus include manufacturing cost of the wheel. Insofar as wires are stationary relative thereto and move with the wheel, there is no abrasion of the wheel, which may thus be manufactured from aluminum. Conductive wires or other filamentous elements, such as optical fiber, of varying sizes may be embedded in plastic by varying the groove profile in the ribs. The apparatus also offers the possibility of manufacturing a low noise cable by using pre-insulated wire and using a conductive plastic either for the initial extrusion or in laminating the final layer, which covers the portion of the elements left exposed during the initial extrusion. Note that hybrid cables may be manufactured employing, for example, both insulated copper wire and optical fiber. The insulated wire may be heat-bonded while the optical fiber is retained by using the periodic dots.

These and other advantages of the invention will be more readily apparent with reference to the drawings and specification which follow.

BRIEF DESCRIPTION OF THE DRAWINGS

FIG. 1 is a diagrammatic view of the extrusion wheel in a cable production line.

FIG. 2A is perspective of part of the wheel.

FIG. 2B is a perspective of part of the wheel with wires thereon.

FIG. 2C is a perspective of part of the wheel with plastic extruded onto the wires to form the seminfinished cable.

FIG. 3 is a cutaway perspective of the guide wheel, extrusion wheel, extrusion head, and semifinished cable.

FIG. 4 is a perspective of the final laminating procedure.

FIG. 5 is a diagrammatic perspective of the prior art apparatus.

FIG. 5A is an enlarged perspective showing the details of the die;

FIGS. 6 through 10 are sequential perspectives showing manufacture of a coaxial ribbon cable having close centerline spacing.

FIG. 11 is an alternative embodiment of coaxial ribbon cable manufactured on a wheel.

FIG. 12 is an enlarged cross section of the coaxial ribbon cable laminate.

FIG. 13A is a perspective of a segment of wheel for making low cross-talk telephone cable.

FIG. 13B is a cross section of a laminate of cables produced on the wheel of FIG. 13A.

FIG. 14 is a perspective of a segment of wheel for making hybrid cable having capturing means for optical fiber.

FIG. 14B is a perspective of a segment of cable made on the wheel of FIG. 14A.

FIG. 15A is a perspective of a segment of wheel for making cable with continuously captured elements.

FIG. 15B is a perspective of a segment of cable made on the wheel of FIG. 15A.

DETAILED DESCRIPTION OF THE PREFERRED EMBODIMENTS

FIG. 1 is a diagrammatic view of the overall manufacturing scheme using the extrusion wheel 50 of the present invention. An extruder 10 provides heat and pressure to deliver molten plastic, such as PVC, to extrusion die 11 where it is extruded against wheel 50. Individual filamentous elements such as copper wires 72 are fed from reels 20 and converge into a single planar array tangent to grooved guide wheel 46, which is mounted for rotation. The wires 72 pass from wheel 46 tangentially toward wheel 50 and pass around an arc on the circumference thereof past extrusion die 11 where semifinished cable 68 is formed. The wheel 50 is mounted to frame 14 by axle 15 and is driven by motor 16 by a chain (not shown), though a gear drive may also be arranged. Cooling tank 18 below the wheel 50 catches water sprayed from nozzle 19 against the wheel to cool the wheel and facilitate curing of the semifinished cable 68.

Referring still to FIG. 1, the semifinished cable 68 is drawn by puller 22 which is synchronized with wheel 50 for uniform cable speed. The puller 22 comprises a pair of endless belts 23 driven by a motor 24. An accumulator 26 comprises an upper spool 27 with a helical cable track thereon and a lower spool 28 with a like track, spool 28 being arranged for height adjustment to take up cable slack downstream thereof, toward trimmer 30. Trimmer 30 removes plastic flash from cable 68 which is present from the molding process. Puller 32 draws semifinished cable 68 from trimmer 30 and feeds it toward a second extrusion wheel 34, where additional plastic is extruded onto the semifinished cable 68 by extruder 36 to make the finished cable 76. The surface of wheel 34 is profiled with a circumferential channel 45 which acts as a guide for the cable. Cable 76 is drawn through trimmer 38 by puller 40 and fed toward reel 44, which is removable from frame 45 for use as a package.

FIG. 2A is a perspective of part of an extrusion wheel 50 having lateral ribs 52, which are parallel to each other and the axis of rotation of the wheel 50. Each rib 52 has a distal surface 53 on a first radius from the axis and a series of grooves 54 thereon which are semicircular in cross section. Each groove 54 is axially aligned with a single groove 54 in the distal surface 53 of each adjacent rib 52; then around the circumference of the ribbed wheel 50, each set of axially aligned grooves defines a circle, the number of circles corresponding to the number of grooves in a single rib. The circles in turn define parallel planes within the wheel 50. The ribs 52 have lateral channels 56 therebetween, each channel 56 having floor 57 on a second radius from the axis, the second radius being less than the first radius. Stated differently, each set of axially aligned grooves 54 could be described as a single groove interrupted by the lateral channels. The wheel has a pair of circumferential rails 60 having distal surfaces 61 on a third radius from the axis, the third radius being greater than the first. The rails 60 flank the ribs 52 and define a circumferential channel 62 between each rail 60 and the end of the ribs 52 adjacent that rail. The ribs 52 are thus bounded at both ends by the channels 62, which have floors 63 on the second radius. Floors 63 are thus continuous with floors 57 of lateral channels 56 and form a continuous cylindrical surface profiled as a ladder.

FIG. 2B depicts the ribbed wheel 50 with wires 72 lying in grooves 54, as between guide wheel 46 and the extrusion die 11 (see also FIG. 3). FIG. 2C depicts the wheel with semifinished cable 68 thereon, as between extrusion die 11 and the take-off point where the cable 68 is drawn tangentially from the wheel 50 by puller 22. The extruded plastic forms a continuous first ribbon 69 in which wires 72 are only partially embedded where they lie against ribs 52. The cable 68 is bounded by side ribs 70 which are formed between the lateral ribs 52 and the circumferential rails 60.

FIG. 3 is a perspective of the extrusion die 11 in proximity with extrusion wheel 50. Note that the die 11 bridges the width of the wheel and is situated in a close clearance with distal surfaces 61 of circumferential rails 60. Plastic is thus extruded into lateral channels 56 and circumferential channels 62 with only a thin ribbon of flash between the die 11 and each distal surface 61. The semifinished cable 68 is drawn from the wheel 50 after it is drawn over a portion thereof; salient features of the structure include lateral bridges 74, formed in lateral channels 56 of the extrusion wheel 50, which completely encase wires 72. The lateral channels 71 in the cable 68 were formed by lateral ribs 52 on the extrusion wheel 50 and leave wires 72 exposed where they lay on distal surfaces 53. The wires 72 are partially embedded in ribbon 69 between bridges 74. Plastic flash which forms between the extrusion die 11 and distal surfaces 61 has been eliminated for clarity. Such flash is trimmed at the subsequent trimmer 30 (FIG. 1).

FIG. 3 also depicts guide wheel 46 as situated proximate to ribbed extrusion wheel 50. The guide wheel 46 is mounted for free rotation, as an idler wheel, and has a series of parallel circumferential grooves 47 therein which are coplanar with circles defined by grooves 54 in the extrusion wheel 50. Thus the wires 72 from reels 20 (FIG. 1) will pass from the guide wheel 46 toward the extrusion wheel 50 in a coplanar array spaced for axial reception in grooves 54.

FIG. 4 is a perspective of the second extrusion wheel 34 where the finished cable 76 is produced by extruding a second ribbon of cable (not shown) through extrusion die 37 against semifinished cable 68, which lies in a circumferential guide channel 35 on the wheel 34. The semifinished cable 68 is positioned in channel 35 on laminating wheel 34, which is driven by an electric motor and carries the cable beneath extrusion die 79 where a second ribbon 77 of plastic insulation is extruded onto semifinished cable 68 to form finished cable 76. Where the semifinished cable 68 and finished cable 76 are rigid PVC, it may be necessary to heat the surface of cable 68 in order to assure a good bond. This is readily accomplished by use of an infrared heater adjacent to cable 68 before passing die 37. PVC with sufficient plasticizer may be bonded without preheating. Plastics with sharper melting points, such as nylon, may require adhesive bonding of a second ribbon of cable to semifinished cable 68 in order to form a finished ribbon cable. The finished cable 73 is structurally similar to prior art cable insofar as it comprises a planar array of wires embedded in plastic and is commonly known as ribbon cable.

Advantages of the apparatus may be best appreciated with reference to a common prior art process as depicted in FIG. 5. Wires 80 are drawn through an extrusion die 79 where plastic is extruded onto the wires by extruder 78. The die 79, shown enlarged in FIG. 5A, consists of two halves sandwiched together to form individual wire receiving apertures through which wires 80 are drawn into a cavity inside the die which receives the extruded plastic. Completed cable 81 exits from a slot at the bottom of the die where it is drawn to the cooling tank. Die 79 is necessarily fabricated from a hard metal such as stainless steel to resist abrasion by continuous movement of metal conductors 80. Insofar as wire position is not strictly controlled in the cavity inside the die, it is subject to some deflection by the force of entering plastic. Additional wire movement after extrusion is still possible since the plastic is not cured as it exits, and thus is subject to thermal deformation. If one of the wires 80 happens to break, considerable down time is expended dismantling the die, placing new wires therein and through to puller 83, and resuming extrusion.

The ribbed extrusion wheel 50 of the instant invention does not suffer wire movement relative to the surface thereof, and thus is not subject to abrasion by the wire. Thus, the wheel 50 may be machined from a soft metal such as aluminum which reduces fabrication costs. As the wires are held in place by the grooves on the ribs while a length of semifinished cable 68 remains on the wheel 50 and is subjected to cooling, curing is accomplished while wire position is controlled, making possible a ribbon cable with closely controlled spacing of wires therein. Wire breakage is readily remedied by displacing the wheel from the extrusion die and replacing the broken wire in the respective axially aligned grooves in the ribs. Alternatively, the replacement wire can be taped to the top of the wheel; after the tape passes the nozzle the cable will be whole again.

The present invention may be utilized with filamentous elements other than copper wire, such as optical fiber, either solely or mixed with electrically conductive elements. Further, insulated wire may be embedded in the plastic where it is desired to use a conductive vehicle such as nylon impregnated with metal powder, which would effectively produce a low cross-talk cable without individual ground wires. In such an embodiment the impregnated plastic itself would attenuate noise between signal conductors. Relative low cost of wheel fabrication permits economical manufacture of relatively short runs of cable where groove radius is varied to accommodate elements of varying gage.

The structure of the semifinished cable may lend it to use as a finished cable in applications where a fully insulated ribbon is not necessary. The advantages would include ready visibility of the filamentous elements and easy exposure for termination. Since the portion of bridge 74 (FIGS. 3 and 4) covering the wires 72 is thin, the wires may be separated simply by pulling them laterally through the bridges 74. This would be a useful expedient in manufacturing a wiring harness; recall that individually insulated wires may be embedded in the cable 68. In the fully insulated version, finished cable 76 may have two different colors which would be helpful in orienting the cable.

Other embodiments within the ambit of the present invention are achieved through different wheel profiles.

FIG. 6 depicts a wheel 90 having a circumferential surface 91 which is interrupted by parallel grooves 93 and flanked by circumferential rails 96. Each groove 93 is profiled by a pair of opposed walls 94 which converge from the circumferential surface 91 toward a floor 95. The walls 94 are symmetric about the center plane of the groove, which is parallel to respective center planes of other grooves 93 on the wheel. The cross section of each groove 93 is the same as the cross section of the portions of the wheel 90 between grooves, which may be described as a symmetric trapezoid. The wheel 90 is installed in the system of FIG. 1 in place of wheel 50, which system is otherwise generally the same.

The absence of lateral channels in wheel 90 necessitates other capturing means for filamentous elements received in grooves 93, and FIG. 7 illustrates a ribbon of fiber mat 100 used to that end. The mat 100 is fed tangently to the circumferential surface 91 of wheel 90 from a reel such as reels 20 of FIG. 1; the mat is likewise fed at the same speed as the elements 72 and the circumferential surface 91 of the wheel 90. The mat 100 is pervious to molten extruded plastic; Reemay mat (a trademark of DuPont) has been found to be suitable. Following tangential alignment of mat 100 with wheel 90, filamentous elements such as coaxial cables 102 are aligned tangentially on the wheel 90 over mat 100 as shown in FIG. 8. Each coaxial cable 102 comprises a signal wire 103 surrounded by insulation 104 which is wrapped in a foil sheath 106 and includes a drain wire 105, as in conventional with coaxial cable. The diameter of the cable is about 0.030 inch and the centerline spacing is about 0.100 inch. A "cigarette wrap" type configuration for sheath 106 is preferred so that the coxial cables 102 can be formed in dies between supply reels 20 and the extrusion wheel 90; this facilitates uniform alignment of the coaxial cables 102 in the grooves 93 with respective drain wires 105 against one of each pair of opposed walls 94. The cables 102 urge the mat 100 into grooves 93 from the position of FIG. 7 to the position of FIG. 8.

FIG. 9 illustrates two identical ribbons of plastic 110, 110' formed by aligning mat 100 and cables 102 on wheel 90 as shown in FIG. 8, and extruding molten plastic thereagainst from an extrusion head as shown in FIG. 11. Circumferential rails 96 (FIGS. 6, 7, and 8) substantially limit lateral flow of extruded plastic; any excess is trimmed as with the ribbed cable heretofore described. Mat 100 is impregnated with plastic insulation to capture the cables 102 against the first surface 112 of semifinished cable 110. The first surface 112 and coaxial cables 102 embedded therein thus form alternating ridges 114 and valleys 115 individually flanked by opposed walls 116. Semifinished flat ribbon cable 110 is shown aligned with a second identical semifinish 110' thereabove for laminating together; the wheel profile heretofore described assures that the ridges 114 in semifinish 110 will be received in the valleys 115' of semifinish 110', and the ridges 114' in semifinish 110' will be received in the valleys 115 of semifinish 110.

FIG. 10 illustrates the modular aspect of a finished multiconductor ribbon cable so formed; a bottom layer of semifinished flat ribbon cable 110 can be offset from a top layer of semifinished flat ribbon cable 110' to build a finished cable of any desired width with the coaxial cables 102 on 0.100 inch centers. Note that any filamentous elements may be used in place of the mini-coaxial cables 102 described; this example is described primarily to illustrate the usefulness of the wheel profile described.

FIG. 11 shows an alternative use of semifinished cable 110 wherein it is laminated against a second ribbon 118 of insulation only which was extruded in the same wheel without wires or cables in the grooves. Alternatively, second ribbon 118 may be extruded directly against ribbon 110 at an extruder 36 as shown in FIG. 1. Note that in lieu of a second ribbon 118 of insulation only a ribbon containing conventional copper conductor or other filamentous elements such as optical fiber could be laminated against cable 110.

To achieve a coplanar array of elements when the semifinished flat ribbon cables 110, 110' are mated, the grooves of wheel 90 must be designed for the particular size of coaxial cable 102 to be used in the semifinished cable. FIG. 12 is a cross section of the finished cable detailing the geometry necessary to achieve a coplanar array of conductors. "R" represents the radius of the coaxial cable 102, taken from the center of signal wire 103 to the surface of sheath 106 where it lies against the surface of the semifinished cable 110, i.e., "R" is not taken through drain wire 105. "R" thus represents the distance from the center of the cable 102 to the point of tangency with wall 116 of the adjacent cable. "C" represents the center-to-center spacing of coaxial cables 102, 102', and "C/2" thus represents the horizontal distance from the center of coaxial cables 102, 102' to walls 116, 116' when the semifinished cable is flat and the coaxial cables 102, 102' are all coplanar. The angle $\theta$ is thus defined by the relationship $\cos \theta = R \div C/2 = 2R/C$. The angle which the walls of the grooves 93 (FIG. 6) must form with a plane perpendicular to the axis of wheel 90 is therefore defined by the relationship $\theta = \arccos(2R/C)$ for filamentous elements of radius R on centers C. This coplanar relationship is desirable for purposes of stripping and terminating the cable. Note that the fiber mat 104 is not shown in FIG. 12 and has been disregarded for simplicity, but a mat of thickness "T" yields the equation $\cos \theta = (R+T)/(C/2 + T/\cos\theta)$. Where the centerline spacing becomes large relative to the size of the elements in the trapezoidal grooves, $\theta$ increases so that the grooves have an increasingly shallow profile. This could cause the filamentous elements to "wander" in the grooves, which would cause loss of control of centerline spacing. This would generally dictate using the arrangement of FIG. 11.

FIG. 13A illustrates a wheel 120 useful for making low cross-talk telephone cable of the type described in U.S. Pat. No. 4,149,026, where conductors in each of two planar arrays are precisely spaced relative to the conductors in the other array. A circumferential surface 121 is interrupted by a series of parallel grooves 122 each having a pair of opposed sidewalls 123 and a floor 124, the grooves 122 being of symmetric trapezoidal cross section. The surface 121 is further interrupted by a series of parallel ridges 125, each ridge having a pair of sidewalls 126 and a distal surface 127, the ridges 125 being of the same trapezoidal cross section as grooves 122. Note that one of the sidewalls 126 is coplanar with one of the sidewalls 123 of an adjacent groove 122, whereas the other sidewall 126 of each ridge 125 is spaced from the other adjacent groove 122 by a portion of circumferential surface 121. The circumferential surface 121 is bounded by lateral rails 130 which are higher than the ridges 125 serve to contain the extruded plastic against lateral flow. Round copper conductors are laid in the grooves 122 prior to extrusion; a fiber mat may also be used as shown in FIG. 8. Such a mat could be chosen for its dielectric properties to reduce cross-talk in addition to serving a retention function by plastic impregnation. FIG. 13B is a cross section of two identical semifinished cables 129, 129' produced on wheel 120 using round copper conductors 128 and laminated together to form a finished low cross-talk cable. Angles and spacing of sidewalls 123, as well as distance between grooves 122, are designed for a given size conductor 128 in order to achieve the desired spacing between conductors.

FIG. 14A depicts a wheel 132 designed for manufacturing a ribbon cable with both conventional wire and optical fiber. Circumferential surface 133 is interrupted by grooves 134 which are profiled as a segment of circular arc and grooves 135 which are likewise profiled as a segment of circular arc, albeit of smaller radius than grooves 134. All grooves 134 and 135 are parallel and follow planes perpendicular to the axis of the wheel. The circumferential surface 133 is further profiled by recesses 136 along the length of each groove 135, each recess 136 being wider and deeper than the groove 135. FIG. 14B is a perspective of a hybrid cable 140 manufactured on wheel 132. Insulated power wires 141 are heat bonded to the plastic cable insulation while the optical fibers 143 are retained by studs 144 formed in recesses 136. This is desirable as it has been found that the higher pressures associated with more complete encapsulation reduce the light transmission in unjacketed fibers.

FIG. 15A is a perspective of a portion of a wheel 150 having a circumferential surface 151 interrupted by grooves 152 and flanked by rails 153. Each groove 152 is profiled as a segment of circular arc substantially less than 180 degrees, in this case about 120 degrees, whereby a filamentous element of like radius laid therein will be flush therewith over the 120 degrees. This results in a cable 157 as shown in FIG. 14B, where individual insulated wires 155 are mechanically trapped in the cable insulation, by virtue of 240 degrees of the circumference of each wire being embedded. This method combined with melt-bonding results in especially good retention of elements, while retaining a perfect centerline registration and producing a cable thin enough to allow easy insulation displacement.

Note that for all embodiments described above the grooves are described as parallel. While parallel orientation is generally desirable, for some applications it would be desirable to have the elements waver from a rectilinear configuration formed by a wheel having grooves in parallel planes. For example, if glass optical fiber is to be used, stretching the cable could cause the fibers to fracture. Employing a wheel with wavering grooves would yield a cable with fibers wavering along a slightly circuitous route through the plastic, thus permitting the fibers to straighten out somewhat if the cable is stretched.

The above described embodiments are exemplary and not intended to limit the scope of the claims which follow.

We claim:

1. A substantially endless flat multiconductor cable of the type comprising a plurality of conductors in side-by-side parallel relationship and a ribbon of insulating material in which the conductors are encased, the ribbon of insulating material having oppositely facing first and second major surfaces and side edges, the cable being characterized in that:

the cable is a composite cable comprising first and second cable parts which are substantially identical, the first major surface being on the first cable part and the second major surface being on the second cable part, the first and second cable parts having opposed interface surfaces which are against each other, every other conductor in the cable being embedded in the interface surface of the first cable part, the remaining conductors being embedded in the interface of the second cable part, the first and second cable parts being offset from each other laterally of the cable axis so that every other conductor is between an adjacent pair of the remaining conductors, the cable parts being laminated together at their interface surfaces, each of the cable parts having been manufactured by continuously passing wires partially around the circumference of a molding wheel, extruding thermoplastic material onto the surface of the molding wheel, chilling the extruded thermoplastic while the wires are on the wheel, and continuously removing the cable parts from the wheel.

* * * * *